United States Patent [19]

Gale

[11] Patent Number: 6,165,260

[45] Date of Patent: Dec. 26, 2000

[54] PEARLESCENT PIGMENTS EXHIBITING COLOR TRAVEL

[75] Inventor: Jeannine M. Gale, Peekskill, N.Y.

[73] Assignee: Engelhard Corporation, Iselin, N.J.

[21] Appl. No.: 09/281,025

[22] Filed: Mar. 30, 1999

[51] Int. Cl.[7] .................... C09C 1/36; C09C 1/24
[52] U.S. Cl. ............ 106/439; 106/415; 106/418
[58] Field of Search ..................... 106/415, 418, 106/439

[56] References Cited

U.S. PATENT DOCUMENTS

| | | | |
|---|---|---|---|
| 3,087,828 | 4/1963 | Linton | 106/417 |
| 3,087,829 | 4/1963 | Linton | 106/417 |
| 3,437,515 | 4/1969 | Quinn et al. | 427/164 |
| 3,711,308 | 1/1973 | Brand et al. | 106/417 |
| 3,861,946 | 1/1975 | Waitkins et al. | 428/404 |
| 3,874,890 | 4/1975 | Bernhard et al. | 106/418 |
| 3,926,659 | 12/1975 | Bernhard et al. | 106/418 |
| 3,936,659 | 2/1976 | Mainord | 219/413 |
| 4,146,403 | 3/1979 | Armanini et al. | 106/418 |
| 4,623,396 | 11/1986 | Kimura et al. | 106/417 |
| 4,744,832 | 5/1988 | Franz et al. | 428/324 |
| 5,271,771 | 12/1993 | Franz et al. | 106/474 |
| 5,366,763 | 11/1994 | McDaniel | 427/193 |
| 5,433,779 | 7/1995 | DeLuca, Jr. | 106/418 |
| 5,565,024 | 10/1996 | Schraml-Marth | 106/415 |
| 5,611,851 | 3/1997 | DeLuca et al. | 106/415 |
| 5,690,916 | 11/1997 | Kimura et al. | 424/59 |

FOREIGN PATENT DOCUMENTS

4104310 A1  8/1992  Germany.

*Primary Examiner*—Anthony Green
*Attorney, Agent, or Firm*—Ostrolenk, Faber, Gerb & Soffen, LLP

[57] ABSTRACT

A metal substrate having a pearlescent pigment coating thereon in which the pearlescent pigment is an iron oxide-coated interference thickness titanium dioxide platelet and in which the iron content of the combined oxide coatings is at least 1% exhibits color travel.

18 Claims, No Drawings

PEARLESCENT PIGMENTS EXHIBITING COLOR TRAVEL

BACKGROUND OF THE INVENTION

Nacreous pigments exhibit pearl-like and/or iridescent effects upon the transmission and reflection of light therethrough. As is well known in the art, the characteristics of such pigments depends upon optical interference phenomena as more fully described, for example, in "The Properties of Nacreous Pigments", Greenstein and Miller, Technical Papers, Vol. XIII, Annual Technical Conference, Society of Plastic Engineers, May 1967.

Nacreous pigments are conventionally formulated for use in suspensions of light transmitting resinous media which can be applied by dipping or spraying operations to form plastic coatings or by extruding, molding, casting or like techniques to provide solid plastic articles incorporating such pigments. Nacreous pigments so utilized should have indexes of refraction which differ from the suspending media because the pearly or nacreous effect displayed by such pigments depends upon the difference between the index of refraction of the oriented, plate-like pigment particles and the index of refraction of the medium in which they are dispersed.

Mica by itself is not a satisfactory nacreous pigment inasmuch as its average index of refraction is about 1.58 which is too close to the index of conventional transparent resinous media of about 1.5–1.59. Excellent nacreous pigments may, however, be provided by the deposition of titanium dioxide or iron oxide coatings on mica flakes.

Linton U.S. Pat. No. 3,087,828 describes the preparation of 20–250μ titanium dioxide coated mica nacreous pigments which optionally can be topped with a layer of iron oxide, the latter layer amounting to 0.5 to 20 weight percent of the titanium dioxide. The amount of $Fe_2O_3$ is thus 4.9–16.7% (or calculated as Fe is 3.4–11.7%) of the total weight of the two oxides. The patent indicates that the titanium dioxide layer is at least 10 weight percent of the pigment and indicates that 10 weight percent is equivalent to about 50 mg $TiO_2/m^2$ mica or a $TiO_2$ geometric thickness of about 30 mμ.

Linton U.S. Pat. No. 3,087,829 describes a pigment made by depositing hydrated iron oxide on mica and the coating is then dehydrated and crystallized by means of heat resulting in an iron oxide coated mica pigment. The iron oxide constitutes 10 to 40 weight percent of the pigment.

Brand, et al. U.S. Pat. No. 3,711,308 teaches a coated mica pigment in which a first coat contains titanium or zirconium oxide mixed with iron oxide and a second layer of only the titanium or zirconium oxides which is about twice as thick as the first coating. Bernhard, et al. U.S. Pat. No. 3,874,890 teaches a $TiO_2$ coated mica pigment which is top coated with iron oxide in an amount up to 20 percent of the final pigment. The $TiO_2$ coating is about 100–300 mg $TiO_2/m^2$ of mica surface which, based on Linton's teachings, means that the geometric thickness of the titanium layer is about 60 mμ.

Bernhard, et al. U.S. Pat. No. 3,926,659 teaches that in a mica/$TiO_2$ or $ZrO_2/Fe_2O_3$ pigment, the $TiO_2$ or $ZrO_2$ interlayer can be reduced to as little as 5 mg/$m^2$ if the iron is initially deposited as a single form of iron (III) oxide hydroxide, viz., only one of α, β or γ-FeOOH or magnetite.

Armanini, et al. U.S. Pat. No. 4,146,403 describes iron oxide-coated mica nacreous pigments which are improved by interposing a thin layer of titanium dioxide or aluminum oxide between the iron oxide and the mica. Dark colors and a very good adhesion of the iron oxide layer are obtained.

Pearlescent or nacreous pigments are frequently evaluated by examining or measuring reflectance by means of conventional drawdowns on a hiding power chart. For instance, drawdowns are prepared from a suspension containing 3% pigment in a nitrocellulose lacquer as described, inter alia, in the aforementioned Armanini, et al. patent.

The pearlescent pigments are conventionally used to color various materials. They can be incorporated, for instance, in plastics or coated on a substrate using conventional techniques. In such applications, the pearlescent plastics exhibit a constant pearlescent effect. It has now been surprisingly discovered that certain pearlescent pigments exhibit a unique effect when coated on a color card, a metallic substrate or incorporated into a plastic chip. More particularly, these pigments exhibit unique "color travel", i.e., the apparent color changes as the angle of viewing changes.

SUMMARY OF THE INVENTION

This invention is related to new articles exhibiting color travel and their preparation. More particularly, the invention relates to a metallic substrate having a pearlescent pigment coating thereon in which the pearlescent pigment is an iron oxide-coated titanium dioxide platelet nacreous pigment in which the titanium dioxide coating has an interference thickness and the content of iron is at least about 1% based on the total weight of both oxide coatings. Those pearlescent pigments in which the iron is at least 12% of the combined iron and titanium oxide coatings are new and are also a part of this invention.

DETAILED DESCRIPTION OF THE INVENTION

The pearlescent pigments used in the present invention are iron oxide-coated titanium dioxide platelet nacreous pigments. The titanium dioxide platelet nacreous pigment can be titanium dioxide-coated mica or titanium dioxide-coated borosilicates or even titanium dioxide-coated mica from which the mica has been removed. Such pigments are, in the general sense, known. They are described, inter alia, in the references described above. The "unsupported" (i.e., self supporting) $TiO_2$ is described, for instance in U.S. Pat. Nos. 3,861,946 and 5,611,851. Any known procedures can be used to prepare such pigments. The formulation of coating compositions containing such pigments and the coating of substrates is likewise known.

The pearlescent pigments of the present invention differ from the general state of the art in two respects. First, the titanium dioxide coating has an interference color thickness. This generally ranges from about 60 to 150 nm. The provision of interference thick titanium dioxide platelet pearlescent pigments is, standing alone, known in the art. The $TiO_2$ can be in either the anatase or rutile crystalline forms.

The second difference is that the quantity of iron in the iron and titanium oxide coatings is at least about 1%. Preferably, the amount is about 1–20% and more preferably from 12–18%. Those pigments in which the amount of iron is at least 12% are new. For example, the amount of iron in the iron oxide-coated titanium dioxide-coated mica nacreous pigment of the Linton U.S. Pat. No. 3,087,828 is up to 11.7% of the combined oxide coatings. There is no indication in that patent that the pigments in which the titanium oxide coating may or may not be of interference thickness and the amount of iron is 11.7% or less exhibits color travel when applied to a color card, a metallic substrate or incorporated into a plastic chip.

The following examples are set forth in order to further illustrate the invention without being intended to limit it. Throughout the specification and claims, all parts and percentages are by weight and all temperatures and degrees are centigrade unless otherwise indicated.

EXAMPLE 1

A slurry of 300 grams of a rutile titanium dioxide coated mica having a violet interference color was slurried in 3 liters of demineralized water and heated to 74° C. The slurry was acidified with dilute hydrochloric acid to a pH of 3. A ferric chloride solution was added while stirring and the pH maintained using a solution of sodium hydroxide. The sample was filtered, washed and calcined to yield a product with color travel from a blue green to yellow green to an orange color. This color travel was confirmed by making color measurements using a Hunter Lab CMS-1500 Goniospectrophotometer. The color measurements are summarized in Table 1.

TABLE 1

| Angle | L* | a* | b* |
|---|---|---|---|
| 45/10 | 88.67 | −36.45 | −16.42 |
| 45/20 | 78.13 | −28.71 | −8.16 |
| 45/30 | 64.62 | −18.38 | 0.31 |
| 45/40 | 53.34 | −7.90 | 6.68 |
| 45/50 | 46.00 | −0.07 | 12.49 |
| 45/60 | 41.33 | 5.86 | 16.25 |

EXAMPLE 2

Example 1 was repeated except that the $TiO_2$-coated mica was an anatase titanium dioxide structure and the interference color was blue. The sample was filtered, washed and calcined to yield a product with color travel from a yellow green to an orange color. This color travel was confirmed by making color measurements using a Hunter Lab CMS-1500 Goniospectrophotomer. The color measurements are summarized in Table 2.

TABLE 2

| Angle | L* | a* | b* |
|---|---|---|---|
| 45/10 | 101.92 | −37.44 | 22.10 |
| 45/20 | 87.67 | −27.38 | 24.72 |
| 45/30 | 70.58 | −16.95 | 25.35 |
| 45/40 | 57.20 | −8.28 | 24.73 |
| 45/50 | 47.81 | −1.30 | 24.29 |
| 45/60 | 42.39 | 4.01 | 23.75 |

EXAMPLE 3

A slurry of 300 grams of titanium dioxide coated mica having a gold interference color was slurried in 3 liters of demineralized water and heated to 74° C. The slurry was acidified with dilute hydrochloric acid to a pH of 3. A ferric chloride solution was added while stirring and the pH maintained using a solution of sodium hydroxide. The sample was filtered, washed and calcined to yield a product with color travel from a strong red to orange to a yellowish orange color. This color travel was confirmed by making color measurements using a Hunter Lab CMS-1500 Goniospectrophotometer. The color measurements are summarized in Table 3.

TABLE 3

| Angle | L* | a* | b* |
|---|---|---|---|
| 45/0 | 84.27 | 20.49 | −0.62 |
| 45/10 | 51.98 | 24.00 | 3.13 |
| 45/20 | 30.70 | 14.86 | 13.58 |
| 45/30 | 25.24 | 9.25 | 19.58 |
| 45/40 | 23.64 | 7.33 | 21.52 |
| 45/50 | 23.21 | 6.83 | 22.26 |
| 45/60 | 23.32 | 6.67 | 22.46 |

EXAMPLE 4

A slurry of 300 grams of titanium dioxide coated mica having a gold interference color was slurried in 3 liters of demineralized water and heated to 74° C. The slurry was acidified with dilute hydrochloric acid to a pH of 3. A ferric chloride solution was added while stirring and the pH maintained using a solution of sodium hydroxide. The sample was filtered, washed and calcined to yield a product with color travel from a strong violet to a reddish yellow color. This color travel was confirmed by making color measurements using a Hunter Lab CMS-1500 Goniospectrophotometer. The color measurements are summarized in Table 4.

TABLE 4

| Angle | L* | a* | b* |
|---|---|---|---|
| 45/0 | 184.52 | 35.71 | −23.46 |
| 45/10 | 46.99 | 21.97 | −9.46 |
| 45/20 | 28.01 | 15.64 | 6.78 |
| 45/30 | 23.53 | 11.83 | 17.80 |
| 45/40 | 22.25 | 10.88 | 21.78 |
| 45/50 | 22.00 | 10.54 | 23.06 |
| 45/60 | 22.06 | 10.32 | 23.45 |

EXAMPLE 5

A slurry of 300 grams of titanium dioxide coated mica having a violet interference color was slurried in 3 liters of demineralized water and heated to 74° C. The slurry was acidified with dilute hydrochloric acid to a pH of 3. A ferric chloride solution was added while stirring and the pH maintained using a solution of sodium hydroxide. The sample was filtered, washed and calcined to yield a product with color travel from a strong bluish-purple to red to a reddish yellow color. This color travel was confirmed by making color measurements using a Hunter Lab CMS-1500 Goniospectrophotometer. The color measurements are summarized in Table 5.

TABLE 5

| Angle | L* | a* | b* |
|---|---|---|---|
| 45/0 | 200.92 | 38.78 | −76.69 |
| 45/10 | 52.14 | 16.43 | −29.93 |
| 45/20 | 33.87 | 6.49 | −0.67 |
| 45/30 | 30.68 | 4.06 | 13.62 |
| 45/40 | 29.95 | 3.74 | 18.54 |
| 45/50 | 29.80 | 3.57 | 20.48 |
| 45/60 | 29.94 | 3.55 | 21.04 |

EXAMPLE 6

A slurry of 300 grams of titanium dioxide coated mica having a violet interference color was slurried in 3 liters of demineralized water and heated to 74° C. The slurry was acidified with dilute hydrochloric acid to a pH of 3. A ferric chloride solution was added while stirring and the pH maintained using a solution of sodium hydroxide. The sample was filtered, washed and calcined to yield a product with color travel from a strong reddish-blue to a reddish orange color. This color travel was confirmed by making color measurements using a Hunter Lab CMS-1500 Goniospectrophotometer. The color measurements are summarized in Table 6.

TABLE 6

| Angle | L* | a* | b* |
|---|---|---|---|
| 45/0 | 200.48 | 8.80 | −70.85 |
| 45/10 | 51.52 | 3.07 | −26.81 |
| 45/20 | 32.01 | 4.68 | 0.84 |
| 45/30 | 28.07 | 7.30 | 14.80 |
| 45/40 | 27.01 | 8.36 | 19.70 |
| 45/50 | 26.85 | 8.68 | 21.61 |
| 45/60 | 26.89 | 8.72 | 22.33 |

EXAMPLE 7

A slurry of 300 grams of titanium dioxide coated mica having a violet interference color was slurried in 3 liters of demineralized water and heated to 74° C. The slurry was acidified with dilute hydrochloric acid to a pH of 3. A ferric chloride solution was added while stirring and the pH maintained using a solution of sodium hydroxide. The sample was filtered, washed and calcined to yield a product with color travel from a strong yellow-green to yellow to an orange color. This color travel was confirmed by making color measurements using a Hunter Lab CMS-1500 Goniospectrophotometer. The color measurements are summarized in Table 7.

TABLE 7

| Angle | L* | a* | b* |
|---|---|---|---|
| 45/0 | 229.97 | −48.32 | 6.08 |
| 45/10 | 57.34 | −17.02 | 8.65 |
| 45/20 | 30.79 | 0.51 | 15.61 |
| 45/30 | 23.40 | 8.91 | 18.67 |
| 45/40 | 21.34 | 11.56 | 19.06 |
| 45/50 | 20.70 | 12.57 | 19.08 |
| 45/60 | 20.60 | 13.12 | 19.20 |

EXAMPLE 8

A slurry of 300 grams of titanium dioxide coated mica having a red interference color was slurried in 3 liters of demineralized water and heated to 74° C. The slurry was acidified with dilute hydrochloric acid to a pH of 3. A ferric chloride solution was added while stirring and the pH maintained using a solution of sodium hydroxide. The sample was filtered, washed and calcined to yield a product with color travel from a reddish-blue to yellow orange color. This color travel was confirmed by making color measurements using a Hunter Lab CMS-1500 Goniospectrophotometer. The color measurements are summarized in Table 8.

TABLE 8

| Angle | L* | a* | b* |
|---|---|---|---|
| 45/0 | 198.94 | 6.21 | −30.57 |
| 45/10 | 42.54 | 4.09 | −13.75 |

TABLE 8-continued

| Angle | L* | a* | b* |
|---|---|---|---|
| 45/20 | 27.14 | 7.94 | 3.97 |
| 45/30 | 23.59 | 10.85 | 16.01 |
| 45/40 | 22.45 | 12.04 | 21.40 |
| 45/50 | 22.10 | 12.65 | 23.85 |
| 45/60 | 21.94 | 12.85 | 24.69 |

EXAMPLE 9

A slurry of 300 grams of titanium dioxide coated mica having a blue interference color was slurried in 3 liters of demineralized water and heated to 74° C. The slurry was acidified with dilute hydrochloric acid to a pH of 3. A ferric chloride solution was added while stirring and the pH maintained using a solution of sodium hydroxide. The sample was filtered, washed and calcined to yield a product with color travel from a yellow green to an orange color. This color travel was confirmed by making color measurements using a Hunter Lab CMS-1500 Goniospectrophotometer. The color measurements are summarized in Table 9.

TABLE 9

| Angle | L* | a* | b* |
|---|---|---|---|
| 45/0 | 215.01 | −29.19 | 43.96 |
| 45/10 | 60.99 | −10.97 | 28.11 |
| 45/20 | 33.31 | 1.45 | 24.29 |
| 45/30 | 24.27 | 7.81 | 20.43 |
| 45/40 | 21.51 | 9.82 | 18.52 |
| 45/50 | 20.68 | 10.63 | 17.64 |
| 45/60 | 20.62 | 11.14 | 17.35 |

EXAMPLE 10

A slurry of 300 grams of titanium dioxide coated calcium sodium borosilicate having a gold interference color was slurried in 3 liters of demineralized water and heated to 74° C. The slurry was acidified with dilute hydrochloric acid to a pH of 3. A ferric chloride solution was added while stirring and the pH maintained using a solution of sodium hydroxide. The sample was filtered, washed and calcined to yield a product with color travel from blue-green to orange to a reddish orange color. This color travel was confirmed by making color measurements using a Hunter Lab CMS-1500 Goniospectrophotometer. The color measurements are summarized in Table 10.

TABLE 10

| Angle | L* | a* | b* |
|---|---|---|---|
| 45/0 | 203.19 | −13.84 | −5.02 |
| 45/10 | 44.53 | −4.08 | 2.33 |
| 45/20 | 28.68 | 5.58 | 9.09 |
| 45/30 | 23.45 | 10.69 | 13.12 |
| 45/40 | 21.85 | 12.62 | 14.68 |
| 45/50 | 21.33 | 13.29 | 15.01 |
| 45/60 | 21.25 | 13.69 | 15.16 |

EXAMPLE 11

A slurry of 40 grams of platy titanium dioxide having a red interference color was slurried in 1 liters of demineralized water and heated to 74° C. The slurry was acidified with dilute hydrochloric acid to a pH of 3. A ferric chloride solution was added to a red-violet interference color while stirring and the pH maintained using a solution of sodium hydroxide. The sample was filtered, washed and calcined to yield a product with color travel from red-violet to gold, with strong color purity and reflectivity.

EXAMPLES 12–30

The general procedure of Example 1 was repeated varying the interference color titanium dioxide-coated mica employed and the quantity of the iron oxide coating established. The resulting absorption color, reflection color, and iron content are summarized in the following table.

TABLE 12

| Absorption Color | Reflectance Color | % Fe | % $TiO_2$ | % $Fe_2O_3$ |
|---|---|---|---|---|
| Yellow Orange | Orange | 5.0 | 40.6 | 7.1 |
| Orange | Red | 8.6 | 38.5 | 12.3 |
| Orange | Blue | 15.3 | 32.7 | 21.9 |
| Orangish Copper | Green | 18.3 | 31.0 | 26.2 |
| Pale Orange | Yellow-orange | 3.1 | 45.2 | 4.4 |
| Pale Orange | Orange-red | 5.0 | 44.0 | 7.1 |
| Orange red | Reddish-violet | 8.5 | 42.1 | 12.1 |
| Reddish Orange | Blue | 12.3 | 39.2 | 17.6 |
| Brownish Orange | Teal | 15.1 | 37.3 | 21.6 |
| Pale Yellow | Reddish orange | 1.3 | 47.0 | 1.8 |
| Pale orange red | Purple/red | 3.4 | 45.8 | 4.9 |
| Orange | Blue | 8.5 | 42.2 | 12.1 |
| Orange | Green | 11.8 | 40.2 | 16.9 |
| Reddish Orange | Teal | 4.3 | 49.5 | 7.0 |
| Brownish-orange | Blue-green | 7.7 | 47.7 | 11.0 |
| Gold | Gold | 8.0 | 50.4 | 11.4 |
| Orange | Orange | 11.4 | 47.5 | 16.3 |
| Orangish-copper | Reddish russet | 14.7 | 45.6 | 21.0 |
| Copper | Red/green/brown | 17.4 | 43.4 | 24.9 |

Various changes and modifications can be made in the process and products of this invention without departing from the spirit and scope of the invention. The various embodiments which were disclosed herein were intended to further illustrate the invention but not to limit it.

What is claimed is:

1. A metal substrate having a pearlescent pigment thereon wherein the pearlescent pigment is an iron oxide-coated titanium dioxide platelet pearlescent pigment in which the titanium dioxide has an interference thickness and the amount of iron based on the total weight of the iron oxide and titanium dioxide is about 1–20 weight %.

2. The metal substrate of claim 1 in which the titanium dioxide is in the rutile crystalline form.

3. The metal substrate of claim 2 in which the titanium dioxide platelet is titanium dioxide-coated mica.

4. The metal substrate of claim 3 in which the iron content is at about 1–18%.

5. The metal substrate of claim 4 in which the iron content is at least 12%.

6. The metal substrate of claim 2 in which the titanium dioxide platelet is titanium dioxide-coated calcium sodium borosilicate or self supporting titanium dioxide.

7. The metal substrate of claim 1 in which the titanium dioxide platelet is titanium dioxide-coated calcium sodium borosilicate or self supporting titanium dioxide.

8. The metal substrate of claim 1 in which the titanium dioxide platelet is titanium dioxide-coated mica.

9. The metal substrate of claim 1 in which the iron content is at about 1–18%.

10. The metal substrate of claim 9 in which the iron content is at least 12%.

11. The metal substrate of claim 1 in which the titanium dioxide is in the anatase crystalline form.

12. An iron oxide-coated titanium dioxide platelet pearlescent pigment in which the titanium dioxide has an interference thickness and the amount of iron based on the total weight of the iron oxide and titanium oxide is 12–20%.

13. The pearlescent pigment of claim 12 in which the titanium dioxide is in the rutile crystalline form.

14. The pearlescent pigment of claim 13 in which the iron content is 12–18%.

15. The pearlescent pigment of claim 12 in which the iron content is 12–18%.

16. The pearlescent pigment of claim 12 in which the platelet is titanium dioxide-coated calcium sodium borosilicate or self supporting titanium dioxide.

17. The pearlescent pigment of claim 12 in which the platelet is titanium dioxide-coated mica.

18. The pearlescent pigment of claim 12 in which the titanium dioxide is in the anatase crystalline form.

* * * * *